Jan. 15, 1963  R. J. PYLE ET AL  3,073,717
COATED CARBON ELEMENT FOR USE IN NUCLEAR REACTORS
AND THE PROCESS OF MAKING THE ELEMENT
Filed Dec. 31, 1958
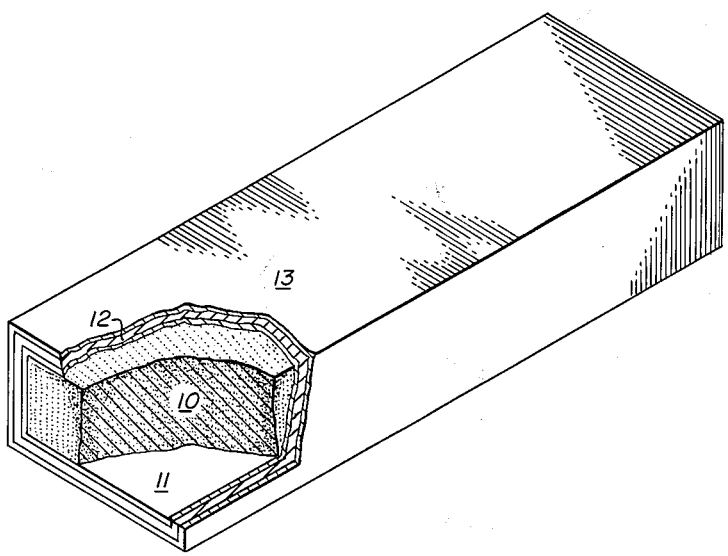
INVENTORS
ROBERT J. PYLE
BY    GERALD L. ALLEN
ATTORNEY

3,073,717
COATED CARBON ELEMENT FOR USE IN NUCLEAR REACTORS AND THE PROCESS OF MAKING THE ELEMENT
Robert J. Pyle, San Diego, and Gerald L. Allen, Pacific Beach, Calif., assignors, by mesne assignments, to the United States of America as represented by the United States Atomic Energy Commission
Filed Dec. 31, 1958, Ser. No. 784,068
4 Claims. (Cl. 117—69)

The present invention relates to an improved graphite or carbon product and more particularly to a graphite or carbon product which is extremely resistant to corrosion and erosion, and also relatively impervious to the passage of gases and vapors and to a method of making the same.

Graphite and carbon are used in nuclear reactors and the like for structural members and in the containment of nuclear fuels. Although graphite and carbon are normally quite permeable or porous, it is extremely important in some of such applications that they be rendered as impervious as possible to the passage of vapors and gases such as vaporous fission products and the like.

Various attempts have been made to produce dense, relatively impervious graphite. However, despite the fact that carbon and graphite have been made in extremely dense forms, such forms usually permit the passage of small amounts of gases and vapors, and therefore are not entirely satisfactory.

Another problem has arisen in connection with the use of carbon and graphite in nuclear reactors. Graphite has a tendency to become corroded and eroded under the operating conditions within the reactor, especially when the reactor core is operated at extremely high temperatures. The problem of corrosion and erosion is especially important in reactors which are designed to have a high "burn-up" period, i.e., to utilize a high proportion of the energy in the fuel. In such reactors the life of the fuel element may extend over a period of several years and, under these conditions, the failure of structural carbon elements may occur due to the deterioration which is effected by corrosion and erosion. It will be understood that the term carbon in the description is intended to denote carbon in any form, e.g., solid amorphous carbon or graphite.

Accordingly, it is the principal object of the invention to provide a carbon element having increased resistance to corrosion and erosion and having a lower permeability to the passage of gases and vapors then the known carbon bodies.

Other objects and advantages of the invention will become apparent from the following description of the invention taken together with the accompanying drawing of which the single FIGURE is a cross-sectional illustration of a coated object produced in accordance with the invention.

We have discovered that the permeability of a carbon body can be decreased and the resistance to corrosion and erosion can be increased by forming in situ on a face or faces of a carbon body, a coating comprised of a nitride of a metal selected from the group consisting of zirconium, molybdenum, titanium, niobium, chromium, silicon, and nickel, or mixtures thereof. Nitride coatings have been found especially desirable since they provide a highly efficient barrier to the passage of gases and vapors and therefore materially lower the gas and vapor transmission characteristics of the carbon. Moreover, these coatings have been found especially efficient at high temperatures since they themselves have low self-diffusion coefficients, that is, they do not tend to diffuse or become dissipated to an objectionable amount over an extended period of time even at high operating temperatures. However, we have also found that the nitride coatings are difficult to bond to a carbon body and also that in the atmosphere maintained in a reactor that they tend to carburize and change their properties in a relatively short period of time.

We have also discovered that these problems may be obviated, as illustrated in FIGURE 1, by first providing surficial areas of the carbon body 10 to be treated with a first coating layer 11 of a carbide selected from the group consisting of zirconium, molybdenum, titanium, niobium, chromium, silicon, and nickel, or mixtures thereof. Thereafter, the nitride coating mentioned above is applied as a second layer 12 over the first carbide coating layer 11 in such a manner that the carbide coating provides an anchor for the subsequent nitride coating and also isolates the nitride coating from contact with the carbon body being treated and therefore substantially decreases any tendency of the nitride coating to carburize.

We have also found that the nitride coating is also desirably covered with a third outermost coating layer 13 comprised of the carbide of a metal selected from the group consisting of zirconium, molybdenum, titanium, niobium, chromium, silicon, and nickel, and mixtures thereof. This outer coating protects the nitride coating from contact with the atmosphere in the reactor.

The composite three layer coating as described above substantially reduces the permeability of the carbon body being treated to gas and vapor transmission and increases its resistance to corrosion and erosion.

Preferably, the coatings as above described are formed in situ on a heated carbon body by disposing the carbon body to be treated to an atmosphere containing the halide of the metallic element to be applied to the carbon body. The carbon body should be heated to a temperature above the decomposition point of the metallic halide and the atmosphere should be so constituted, as will hereinafter be pointed out, that the carbide or nitride of the metal will be formed on the surface of the carbon body being treated.

For example, to provide said carbide coating layer 11, the halide of the metal is vaporized and is dispersed in a nitrogen free (to prevent formation of nitrides), hydrogen containing atmosphere. The carbon body to be treated is heated to a temperature in the range from about 1600 to 2100° C. and is subjected to this atmosphere and the carbide of the metal is formed in situ on the surface of the carbon body to provide a carbide coated body. The nitride layer 12 can be applied in substantially the same way; however, the atmosphere in which the halide is vaporized should contain nitrogen or a nitrogen releasing compound such as ammonia gas. Again, the carbide coated carbon body to be treated is heated to a temperature of from 1600 to 2100° C. and is subjected to this atmosphere whereupon the nitride coating layer 12 of the metal is deposited on the surface of the carbide coated carbon body. The outer metal carbide layer 13 may also be deposited in a similar manner. In this instance, the halide of the metal to be applied is vaporized, and mixed with a carbon containing atmosphere such as one containing methane or other hydrocarbon. The nitride coated carbon body, heated to a temperature of from 1600 to 2100° C., is then subjected to this atmosphere whereupon the outermost carbide coating layer 13 deposits upon the surface thereof.

Apparatus and methods, the manipulatory details of which may be adapted for carrying out such coating are well known in the art and are described in somewhat more detail in one or more of the following United States Patents, Nos. 1,671,213, 1,709,781, 1,987,576 and 1,987,577. The foregoing patents are directed to the application of coatings to wire and the like but the same principles and methods may be employed in coating a carbon body except that in the case of a carbon body means need not be provided for coating the body while it is continuously in movement as in the case of wire.

While coatings of the various metals listed above are generally quite satisfactory, superiors results have been obtained when the carbon body to be treated is coated with certain specific metals from the groups outlined above. In coating the carbon body it is desired first to provide a surface coating layer 11 of zirconium carbide which may be obtained by subjecting a carbon body 10, heated to about 1750° C., to an atmosphere of vaporized zirconium tetra-iodide in a hydrogen atmosphere for a sufficient period of time to result in the production of a layer 11 of zirconium carbide on the surface of the carbon body being treated. The carbide coated carbon body, heated to a temperature of about 1750° C., is then subjected to an atmosphere of vaporized zirconium tetra-iodide and nitrogen to produce a layer 12 of zirconium nitride. The zirconium nitride has a low self-diffusion coefficient and also provides a satisfactory barrier to the passage of gases and vapors.

After the zirconium nitride coating is applied, a protective coating of mixed zirconium and niobium carbide is applied to the body as the outermost layer 13. This is accomplished by subjecting the carbon body, heated to 1750° C., to an atmosphere consisting of vaporized zirconium tetra-iodide, niobium bromide and methane. This results in the production of a mixed layer of zirconium and niobium carbides on the surface of the body. The proportion of the zirconium to the niobium may vary over wide ranges; however, it is preferred that the proportion of niobium be limited to from 10 to 50 percent of the weight of the final coating. This is accomplished by varying the proportions of the zirconium and niobium halides to produce the desired proportions in the treating atmosphere.

A composite zirconium carbide-zirconium nitride-niobium and zirconium carbide coating provides extremely satisfactory results since the zirconium carbide and zirconium nitride are quite compatible and form a diffusion bond between the zirconium carbide and the zirconium nitride. The carbide coatings on each side of the zirconium nitride coating protect it from contact with the carbon body itself and with the atmosphere around the carbon body.

Various features of the invention are set forth in the appended claims.

We claim:

1. A process for treating graphite bodies suitable for use in nuclear reactors to produce a coating resistant to corrosion and erosion and generally impervious to the passage of fission product gases comprising the steps of disposing said body in a hydrogen atmosphere containing zirconium tetraiodide, heating said body in said environment to a temperature above about 1750° C., whereby a zirconium carbide coating is formed on the surface of said body, the thickness of said coating being proportional to the length of said heating time in said environment, further heating said carbide coated body in an atmosphere of nitrogen containing zirconium tetraiodide at a temperature above about 1750° C., whereby a zirconium nitride coating is formed and covers said carbide coating, the thickness of said nitride coating being proportional to the length of heating time in said environment, and heating said carbide and nitride coated body to a temperature above about 1750° in an atmosphere of hydrogen containing zirconium tetraiodide, niobium bromide and methane, whereby an exterior coating of zirconium and niobium carbides is formed and covers the nitride coating of said body.

2. An impervious carbon element for use in the corrosive-erosive, high-temperature atmospheric environment of a nuclear reactor comprising a carbon body, a first coating layer of a carbide of a metal selected from the group consisting of zirconium, niobium, molybdenum, titanium, chromium, silicon, nickel and mixtures thereof disposed upon the surfaces of said body and bonded thereto, a second coating layer of a nitride of a metal selected from the group consisting of zirconium, niobium, molybdenum, titanium, chromium, silicon, nickel and mixtures thereof disposed over said carbide layer, said carbide layer thereby serving to anchor the nitride layer to the carbon body and prevent the carburization thereof by reaction with the carbon body, and a third outermost coating layer of a carbide selected from the group consisting of zirconium, niobium, molybdenum, titanium, chromium, silicon, nickel and mixtures thereof, disposed over and bonded to said nitride layer, said outermost carbide layer serving to protect the nitride layer from the atmospheric environment of said reactor.

3. The element as defined in claim 2 wherein said first coating layer is zirconium carbide, said second coating layer is zirconium nitride, and said third outermost coating layer is a mixture of zirconium and niobium carbide.

4. The element as defined in claim 2 wherein said first coating layer is zirconium carbide, said second coating layer is zirconium nitride, and said third outermost coating layer is an admixture of zirconium and niobium carbides including 10 to 50% by weight of niobium based on the combined amounts of zirconium and niobium therein.

References Cited in the file of this patent

UNITED STATES PATENTS

| | | |
|---|---|---|
| 1,098,794 | Fleming | June 2, 1914 |
| 2,548,897 | Kroll | Apr. 17, 1951 |
| 2,597,963 | Winter | May 27, 1952 |
| 2,910,379 | Gurinsky | Oct. 27, 1959 |
| 2,990,351 | Sanz et al. | June 27, 1961 |
| 2,991,192 | Halden et al. | July 4, 1961 |

OTHER REFERENCES

Powell, C. D., et al.: "Vapor-Plating," John Wiley & Sons, Inc., New York (1955), pages 74 and 95 to 97 relied on.

Proceedings of the Second U.N. International Conference on the Peaceful Uses of Atomic Energy, September 1–13, 1958, vol. 7, pages 374–378. Published by United Nations, Geneva.

"Proceedings of the International Conference on the Peaceful Uses of Atomic Energy," August 8–20, 1955, vol. 9, pages 341–343. Published by United Nations, New York.